July 15, 1941.  C. SMITH  2,249,332
GAME TRAP
Filed Oct. 16, 1939
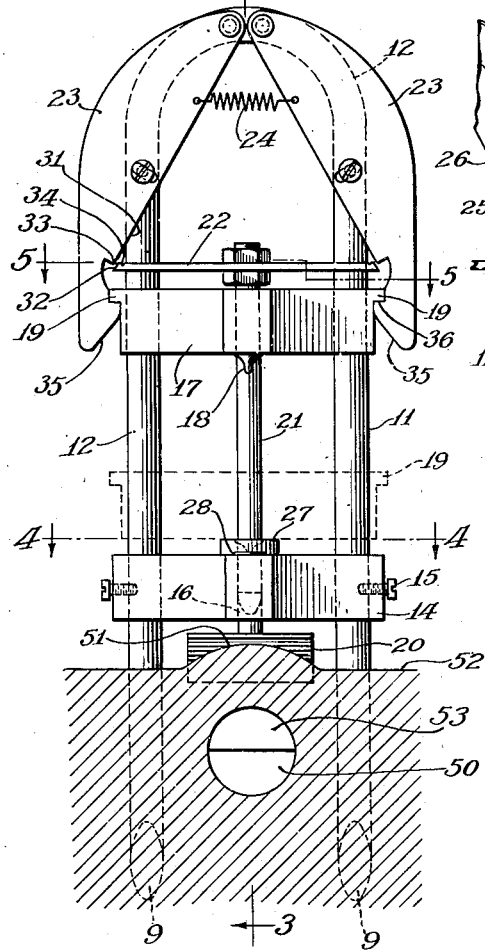
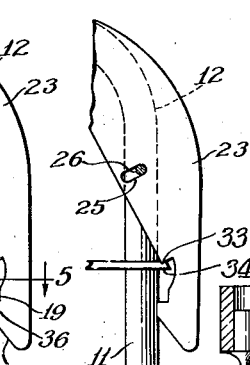
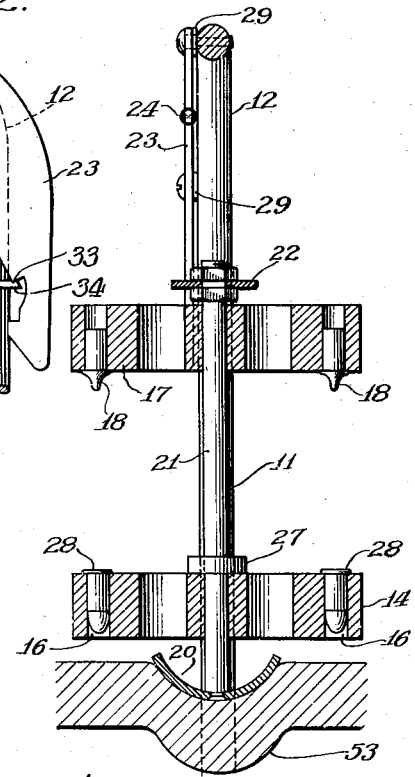
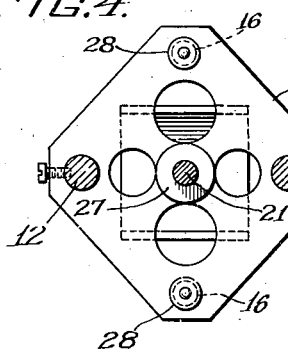
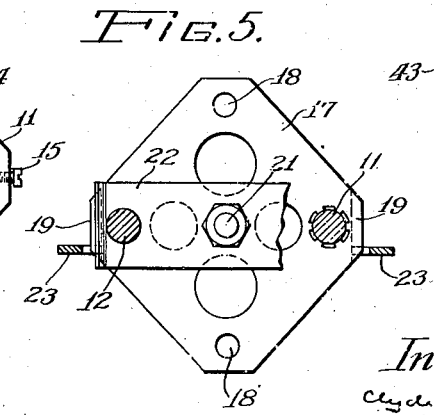
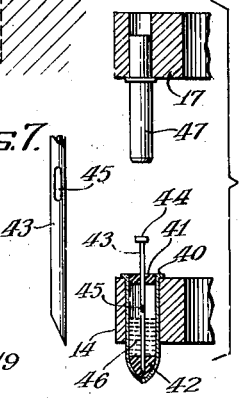
Inventor:
Clyde Smith Patented July 15, 1941

2,249,332

UNITED STATES PATENT OFFICE 2,249,332

GAME TRAP

Clyde Smith, Hopkinsville, Ky.

Application October 16, 1939, Serial No. 299,631

10 Claims. (Cl. 43—84)

This invention pertains to devices for killing animals, specifically moles.

The object of the invention is to set mole-destroying means in effective position, to set in the mole-run an obstacle of such nature as to avoid alarming an approaching mole, and to set the mole-destroying means under the control of said obstacle in trigger manner when a mole moving along the mole-run moves the obstacle.

Further objects are to provide a trap having features of a simple assembly of operating members, and to provide members cooperating in one manner to facilitate setting the trap into adjustment, and cooperating in another manner when operating the trap in response to game.

A further object is to utilize the natural earth surrounding the mole-run to provide an obstacle in the run which may be engaged and moved by the mole to operate a trigger mechanism in the trap.

A further object is to provide means to inject a lethal fluid into the mole or into the mole-run.

The invention will be more fully understood by disclosures of the following description, together with claims and drawing. In the drawing like numerals indicate like parts, and:

Figure 1 shows an elevation of a trap according to this invention; Figure 2, a detail of Figure 1 in a transient condition while setting the trap; Figure 3, a transverse sectional view on the line 3—3 of Figure 1; Figure 4, a horizontal sectional view on the line 4—4 of Figure 1; Figure 5, a horizontal sectional view on the line 5—5 of Figure 1; Figure 6 shows a partial sectional view of a modification of Fig. 3; and Figure 7 an enlarged detail of Figure 6.

Moles form runways by burrowing near the surface, lifting the earth to form the subterranean runway, and thereby forming a ridge on the surface. My method of destroying moles comprises depressing the ridge at a trap site by means of a boot-heel or tamping bar, thereby partially or even wholly refilling the mole-run so that passage of a mole will displace the refilled earth into its ridge formation, then setting a trap trigger member above the displaced earth to be lifted by the earth when the earth is moved by the mole, the trap being provided with lethal equipment located and directed to kill the mole in response to operation of the trigger by the mole. The earth refill thus becomes part of the trap when set for operation. Since the mole may approach the trigger location from either direction, I provide two lethal equipments attacking simultaneously two objective locations, in one of which the mole will be found.

An explosive cartridge firing a bullet into the body of the mole may be utilized; or alternatively a tubular needle may be utilized to penetrate the body of the mole, a lethal fluid being forced through the needle, thus destroying the mole with less damage to the moleskin than would be caused by a bullet.

Referring to Figures 1 to 5 inclusive: The main frame 10 of the trap comprises two side rods 11 and 12, which may be formed of a single rod bent as shown or otherwise united at the top ends. The frame comprises also a bridge member 14, fixed across the side rods in a median location by set screws 15, or otherwise. In the bridge are two firing chambers 16.

Upon the side rods slides freely a gravity firing member 17, carrying two firing pins 18 and having two latching lugs 19. A trigger shoe 20 is attached to the lower end of a trigger rod 21, which passes freely but closely through bridge 14, which passes through firing member 17 with full clearance, and which carries fixed to its top end a trigger plate 22. Shoe 20, rod 21 and plate 22 compose an integral mole detector member.

Near the top of the frame 10 are pivoted two trigger latches 23, tensioned by a spring member 24 and restricted in angular motion by slots 25, which engage stop pins or shoulder screws 26 in frame 10. Each latch 23 has a surface 31 to cooperate with a surface 32 on trigger plate 22, also a stop point 33 to cooperate with a stop notch 34 in plate 22, also an edge 35 to cooperate with the upper corners of lug 19, and finally a shoulder 36 to cooperate with the under surface of lug 19.

Frame rods 11 and 12 extend into the earth on both sides of the mole-run when the trap is set for operation, and are scarfed at 9 in one plane to facilitate entering hard earth with least bending tendency in the median part of the rods where member 17 slides, being guided by the rods.

A loose ring 27 surrounds the trigger rod 21, to space the members 14 and 17 to prevent driving the firing pins 18 too far into the cartridges 28. Washers 29 prevent latches 23 from friction against frame 10.

Referring to Figures 6 and 7: the cartridges 28 are replaced by metal or glass capsules 40, flanged as is a cartridge shell, each closed at top and bottom by flexible annular plugs 41 and 42. Through plug 41 and into plug 42 passes a needle 43, having a striker head 44 and a side opening 45, the needle being tubular at least from the opening 45 to the point of the needle. Each capsule contains air and a lethal fluid 46. Firing pins 18 are replaced by hammer pins 47.

In operation of the preferred form shown in Figures 1 to 5, a mole-run 50 is detected by observing the earth ridge 51 and a short portion of the ridge is driven down to earth level 52, thus projecting an earth refill 53 into the mole-run 50.

Rods 11 and 12 of the cartridge holder are forced into the earth, firing member 17 being in dotted position, until shoe 20, stopped by the earth surface, lifts plate 22 until points 33 and notches 34 are in engagement (see Fig. 2), which gauges the depth of setting the trap stops further progress of rods 11 and 12 into the earth. Each latch thus becomes a combination gauge and latch when the trap is being set. Firing member 14 then is lifted, lugs 19 force latches 23 away from plate 22, and latches drop the shoulders 36 under lugs 19, latching the firing member in set position. Cartridges 28 are inserted in firing chambers 16.

When a mole in run 50 lifts the earth 53, the shoe 20, rod 21, and plate 22 also will be lifted, cam surface 32 will engage cam surface 31, latches 23 will be swung to clear lugs 19, firing member 17 will fall, firing pins 18 will fire cartridges 28, and one or the other of the two bullets will penetrate the body of the mole, respectively as the said body is discovered at right or left of the refill earth 53.

Referring to the modification shown in Figures 6 and 7: when the firing member 17 descends, the hammer 47 drives the needle 43 through the plug 42 and into the body of the mole, then drives the gasket 41 into the body of the capsule, compressing the contained air, and in response to air pressure the lethal fluid 46, flows through opening 45 and through the tubular needle into the body of the mole. Alternatively, the fluid may be forced into the mole-run near the mole and generate an asphyxiating gas which destroys the mole.

The mole trap may be changed in many details without departing from the spirit and scope of my claims.

What I claim is:

1. In a mole trap, a projectile emitter, a cartridge and projectile for said emitter, slidable gravity-operated firing means for said cartridge, vertical slide rods for said firing means, a pair of latches for restraining said firing means, and trigger means comprising in part a mole detector positioned above the mole track and in part latch operating means for operating both latches of said pair to release said firing means in response to movement of said detector by a mole, said emitter being directed toward said mole track.

2. In a mole trap, a cartridge holder including a U-shaped support having two chisel-end studs to position said cartridge holder over a mole-run, a mole detector shoe near said cartridge holder and positioned over a refilled portion of said mole-run, and gravity means sliding on the parallel arms of said U-shaped support to fire said cartridge in response to movement of said detector caused by passage of a mole through said refilled mole-run.

3. In a mole trap settable over a refilled portion of a mole-run, a detector member movable by earth movements incident to clearing said run by a mole, a cartridge holder, a gravity firing member for said cartridge, vertical rods on which said firing member slides, and two latches restraining said firing member in starting position on said rods and operable simultaneously to release said member in response to movement of said detector member.

4. In a mole trap, a mole detector member in engagement with the earth above a refilled mole-run, a cartridge, a trip device and firing pin for said cartridge, two similar latches for said trip device mutually engaging members on said detector member and said latches engageable to effect accurate preliminary setting of said detector member above said mole run, and further mutually engaging members on said detector and on said latches for operating said latches simultaneously to trip said trip device.

5. In a mole trap, a main support member comprising a body member and anchor members partially embedded in the ground above a mole-run, a mole detector member operable by movement of earth in said mole-run when at least partly refilled, mole destroying means held by said main support member, a slidable operating member for said mole destroying means, and a pair of similar latches engaging said slidable operating member and simultaneously responsive to movement of said detector member to disengage said operating member for operation.

6. In a mole trap, a main support member comprising a body member and anchor members partially embedded in the ground above a mole-run, a mole detector member operable by movement of earth in said mole-run when at least partly refilled, a capsule containing mole destroying fluid held by said main support member, a slidable operating member for said capsule for forcing said fluid into said mole-run, and a pair of similar latches engaging said operating member and simultaneously responsive to movement of said detector member to disengage said operating member for operation.

7. In a mole trap, a main plate, a pair of center fire cartridges in said main plate, a firing plate having a face parallel to a face of said main plate, firing pins projecting from said firing plate in positions to engage said cartridges, and a spacer member between said faces of said plates gauging the penetration of said firing pins into said cartridges.

8. In a mole trap, a main plate, a pair of cartridges in said plate and aimed at two points in the mole-run, means to fire both cartridges simultaneously, and a single trigger member responsive to movement of earth midway between said points to operate said means.

9. In a mole trap, a mole detector member in engagement with the surface of the earth, a cartridge holding member, a supporting frame therefor partially imbedded in the earth, a combination gauge and latch attached to said frame and engageable with said detector member in obstructing engagement to determine relative positions of said mole detector member and said frame when said trap is in process of being set, and a firing member in said trap engageable with said combination gauge and latch in latching engagement when said trap is fully set and holding said combination gauge and latch from obstructing engagement with said mole detector member.

10. In a mole trap settable over a refilled portion of a mole run, a detector member movable by earth movements incident to clearing said run by a mole, a cartridge, a cartridge holder, a gravity firing member for said cartridge, vertical rods on which said firing member slides, and a latch restraining said firing member and operable to release said firing member in response to movement of said mole detector member.

CLYDE SMITH.